US007261354B1

(12) United States Patent
Lozano

(10) Patent No.: US 7,261,354 B1
(45) Date of Patent: Aug. 28, 2007

(54) RETRACTABLE AND EXTENSIBLE TRAILER WITH FOLDING RAMP

(76) Inventor: Steven P. Lozano, 15 Susan Ct., Wolcott, CT (US) 06716

( * ) Notice: Subject to any disclaimer, the term of this patent is extended or adjusted under 35 U.S.C. 154(b) by 0 days.

(21) Appl. No.: 11/370,358

(22) Filed: Mar. 7, 2006

(51) Int. Cl.
*B60P 3/32* (2006.01)

(52) U.S. Cl. .................. 296/26.05; 296/61; 414/537

(58) Field of Classification Search ............ 296/26.02, 296/26.04, 26.05, 26.06, 26.07, 61; 414/537
See application file for complete search history.

(56) References Cited

U.S. PATENT DOCUMENTS

| 2,797,124 | A | | 6/1957 | Hauptli |
|---|---|---|---|---|
| 3,734,559 | A | | 5/1973 | Touchette |
| 4,092,039 | A | | 5/1978 | Lutkenhouse |
| 4,206,943 | A | | 6/1980 | Friedenberg |
| 4,392,682 | A | | 7/1983 | Norkus |
| 4,668,002 | A | | 5/1987 | Hanson |
| 5,028,088 | A | * | 7/1991 | Del Monico et al. .... 296/26.04 |
| 5,096,362 | A | | 3/1992 | Best |
| 5,114,202 | A | | 5/1992 | Johnson |
| 5,129,697 | A | | 7/1992 | Heikkinen |
| 5,795,125 | A | | 8/1998 | Walkden |
| 5,907,276 | A | | 5/1999 | Lance |
| 5,961,176 | A | * | 10/1999 | Tilly ........................ 296/165 |
| 6,126,220 | A | | 10/2000 | Brasher |
| 6,250,874 | B1 | | 6/2001 | Cross |
| 6,524,055 | B1 | | 2/2003 | Overbye |
| 6,527,336 | B2 | | 3/2003 | Hernandez |
| 6,722,721 | B2 | | 4/2004 | Sherrer |
| 6,725,487 | B2 | | 4/2004 | Myrick |
| 6,887,028 | B1 | | 5/2005 | Kirla |
| 2005/0127702 | A1 | | 6/2005 | Norfleet |

FOREIGN PATENT DOCUMENTS

GB 2360494 A 9/2001

* cited by examiner

*Primary Examiner*—Joseph D. Pape
(74) *Attorney, Agent, or Firm*—Michael A. Blake

(57) ABSTRACT

A retractable and extensible trailer comprising: a base assembly; a moveable top assembly moveably attached to the base assembly and configured to be infinitely adjustable between a lowered position and an upper position; a trailer substructure in communication with the base assembly; a base front and/or rear folding door located at the front and/or rear of the base assembly and in rotative communication with the trailer substructure. The base front and/or rear folding door comprises: an upper ramp in rotative communication with the trailer substructure; at least one locking plate in fixed communication with the upper ramp; at least one connector plate in rotative communication with the at least one locking plate; and a lower ramp in fixed communication with the at least one connector plate.

9 Claims, 12 Drawing Sheets

RETRACTABLE AND EXTENSIBLE TRAILER WITH FOLDING RAMP

TECHNICAL FIELD

The present invention relates to trailers with folding ramps. More particularly, the present invention relates to a means for varying the height of the trailer roof.

BACKGROUND

As is known to those skilled in the art to which the invention pertains, trailer assemblies have been provided with innovations and accoutrements, designed to facilitate the transfer of a load. However, little attention has been paid to the driving of the assembly when the trailer is either unloaded or only partly loaded. Additionally, little attention has been paid to working within a trailer that may not have enough room for one to stand up in. Also little attention has been made to allowing for relatively simple retrofit of an existing flat trailer such that the flat trailer can be made into a variable height trailer.

Present day trailers, generally, have standard size frames with fixed height sidewalls. This inherently creates problems. For example, current fixed height trailers do not allow the variability in height required to tow different sized cargo. Consumers must either purchase a low trailer that is very difficult for a user to maneuver about inside and can only fit a specific height cargo, but is more efficient to tow, or consumers must purchase a trailer that is tall enough to tow different height cargo and that allows one to move around and/or work inside, but is very inefficient to tow. The latter also results in towing dead air space a majority of the time.

Furthermore, the air resistance about the trailer is constant due to the fixed height trailer walls. By being able to shorten the height of the walls and, therefore, the area thereof the resistance to air is reduced thereby giving somewhat increased fuel mileage and much less cross wind buffeting. Additionally, if one has to work in a trailer that is carrying vehicles, such as snowmobiles, ATV's, or motorcycles, it may be very difficult to service or otherwise work on the vehicles if the trailer roof is too low. Also lower style trailers currently being marketed have ramps that are difficult or impossible to load certain types of cargo due to the steep angle of a short ramp. Current ramps being marketed on these fixed height trailers are only as long as the height of the wall of the trailer.

For all of these reasons, a benefit to the art would be provided by a trailer having an extensible and retractable roof with folding ramps. It is to this to which the present invention is directed.

SUMMARY

The disclosed invention relates to a retractable and extensible trailer comprising: a base assembly; a moveable top assembly moveably attached to the base assembly and configured to be infinitely adjustable between a lowered position and an upper position; a trailer substructure in communication with the base assembly; a base front and/or rear folding door located at the front and/or rear of the base assembly and in rotative communication with the trailer substructure. The base front and/or rear folding door comprises: an upper ramp in rotative communication with the trailer substructure; at least one locking plate in fixed communication with the upper ramp; at least one connector plate in rotative communication with the at least one locking plate; and a lower ramp in fixed communication with the at least one connector plate.

BRIEF DESCRIPTION OF THE DRAWINGS

The present disclosure will be better understood by those skilled in the pertinent art by referencing the accompanying drawings, where like elements are numbered alike in the several figures, in which.

DETAILED DESCRIPTION

Figure 1:
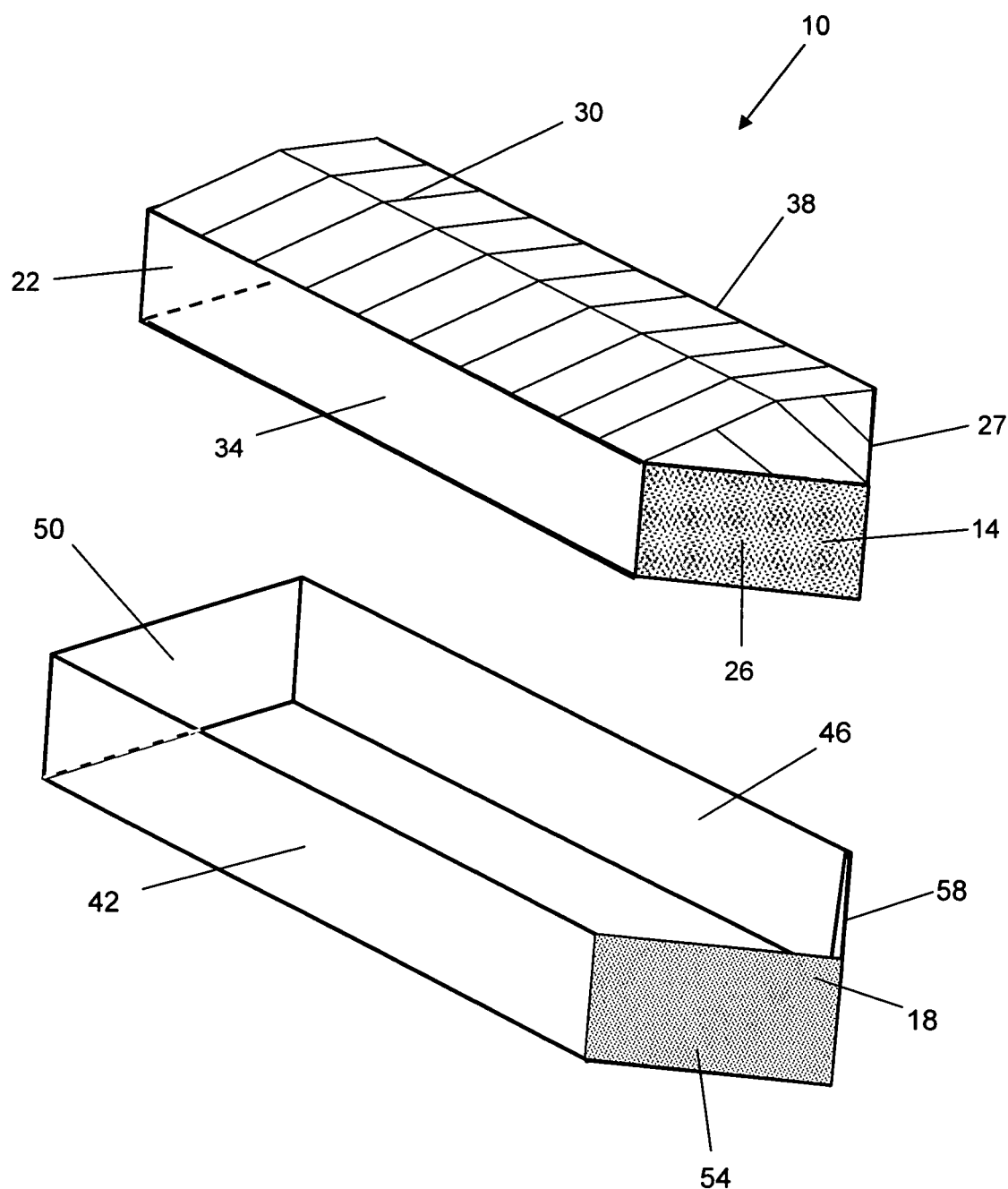
FIG. 1 is a perspective view of a disclosed trailer with an extensible and retractable roof.

FIG. 1 is a perspective view of trailer 10. A moveable top assembly 14 is shown removed from the base assembly 18. The top assembly 14 comprises an aft top folding door 22, and a top front right folding door 26 and a top front left folding door 27. In other embodiments, the top assembly 14, may have only one front folding door, either 26 or 27, or no front folding doors. The top assembly also comprises a roof 30, and a top right fixed wall 34, and a top left fixed wall 38. In the shown embodiment, the roof 30 is a pointed roof design, such a design allows for snow, rain, sleet, to more easily run-off the roof. However, in other embodiments, the roof may be a flat-roof design. It should be obvious to one of ordinary skill that in embodiments where the front of the top assembly 14 has no top folding doors 26,27, then the areas where 26,27 used to be would be fixed walls, similarly in embodiments where there is only one front folding door, such as a top front right folding door 26, then the area where the top front left folding door 27 would have been is a fixed wall, and finally in embodiments where there is only one front folding door, a left front folding door 27, then the area where the right front folding door 26 would have been is a fixed wall. In any case, the front of the trailer has a pointed shape which provides for decreased wind resistance as compared to a flat front trailer. The base assembly 18 comprises a base right fixed wall 42, a base left fixed wall 46, and a base rear folding door 50. The front of the base assembly may have a base right front folding door 54 in one embodiment, a base left front folding door 58 in another embodiment and no front folding doors in still another embodiment. If the right front folding door 54, or the left front folding door 58 are not in the embodiment, then the areas where the doors 54, 58, would have been will be fixed walls. The top assembly 14 and base assembly 18 will be configured such that both assemblies will have matching front door configurations, that is, if the top assembly 14 has only a right front folding door 26, then the base assembly 18 will also only have a right front folding door 54.

Figure 2:
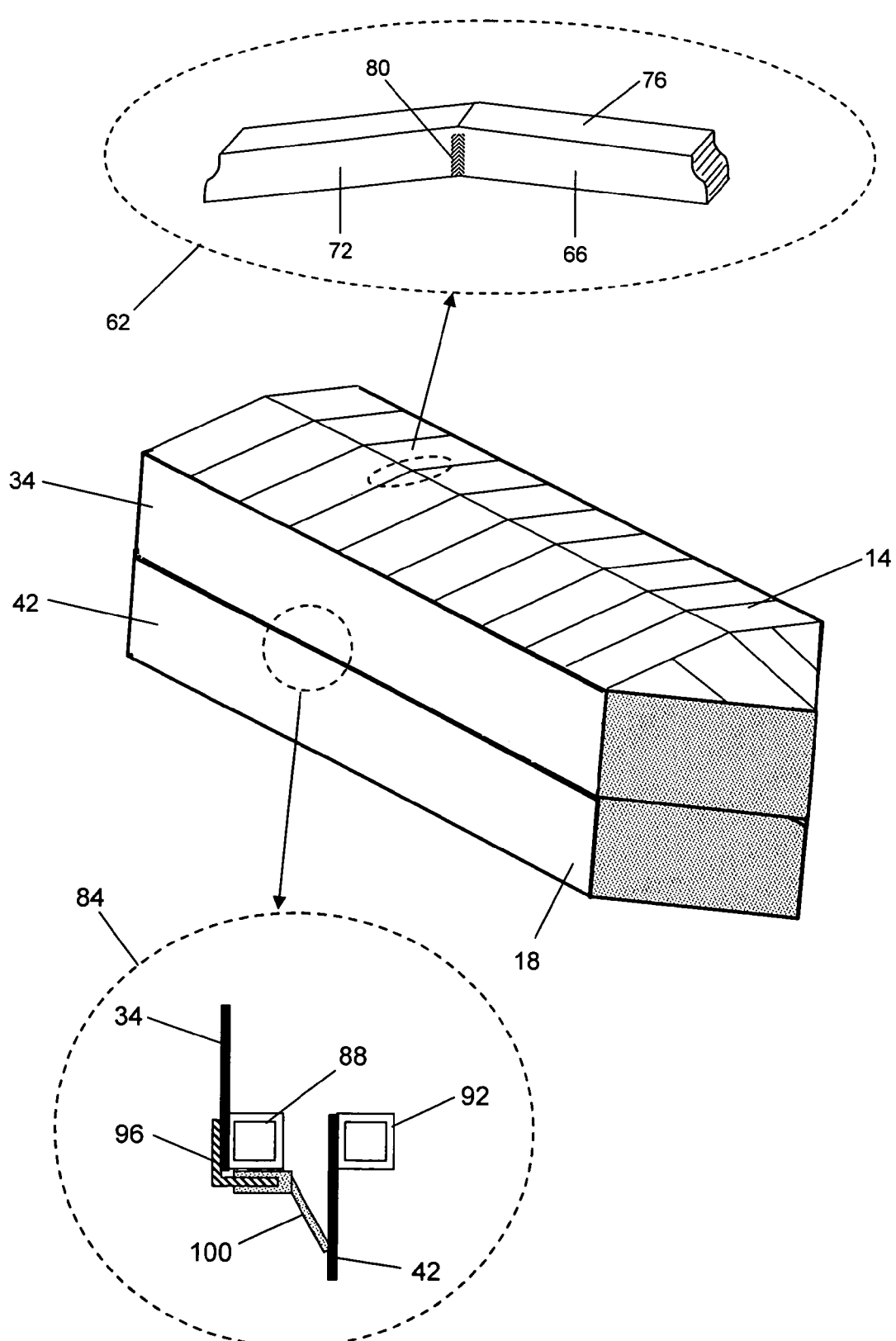
FIG. 2 is a perspective view of the trailer from FIG. 1 with the moveable top assembly in communication with the base assembly.

FIG. 2 shows the trailer 10 with the top assembly 14 installed onto the base assembly 18. A detailed view of the truss arrangement for the pointed roof 30 is shown in the inset 62. A partial view of a single truss 66 is shown. The truss 66 comprises a left member 72 and a right member 76 attached to one another. The attachment means may be a weld 80. The weld 80 may be a single or three welds on three sides of the truss, the front, the bottom, and rear of the truss. Of course fewer welds may be used to attach the right and left members 72, 76. Additionally other attachment means may be used, such as, but not limited to: bolt and adhesive. Inset 84 shows a detailed cross-sectional view of a wiper seal assembly 84 between the top assembly 14 and the base assembly 18. The wiper seal assembly 84 helps to weather proof the interior of the trailer 10. The wiper seal assembly 84 extends generally the entire circumference of moveable top assembly 14. A cross-sectional view of the top right fixed wall 34 and the base right fixed fall 42 are shown. A top fixed wall stability member 88 and base fixed wall stability member 92 are shown attached to their respective walls 34, 42. The stability members 88, 92 may extend generally the entire length of the fixed walls 34, 38, 42, 46. However, in other embodiments, the stability members 92 may be omitted, or be located intermittently along the fixed walls to provide stability to the walls. A rigid member connector 96 is attached to the top right fixed wall 34. The rigid member connector 96 is attached to a flexible member 100. The flexible member 100 may be made of rubber, plastic, or any other suitable flexible material. The flexible member 100 generally extends the entire length of the fixed walls 34, 38, 42, 46 and the top front right folding door 26, the top front left folding door 27, and the aft top folding door 22. The flexible member is configured to impinge on the base right fixed wall 42 to prevent outside elements from entering the interior of the trailer 10. Similarly, a flexible member 100 on the left side of the trailer 10 will be configured to impinge on the base left fixed wall 46 to prevent outside elements from entering the interior of the trailer 10.

Figure 3:
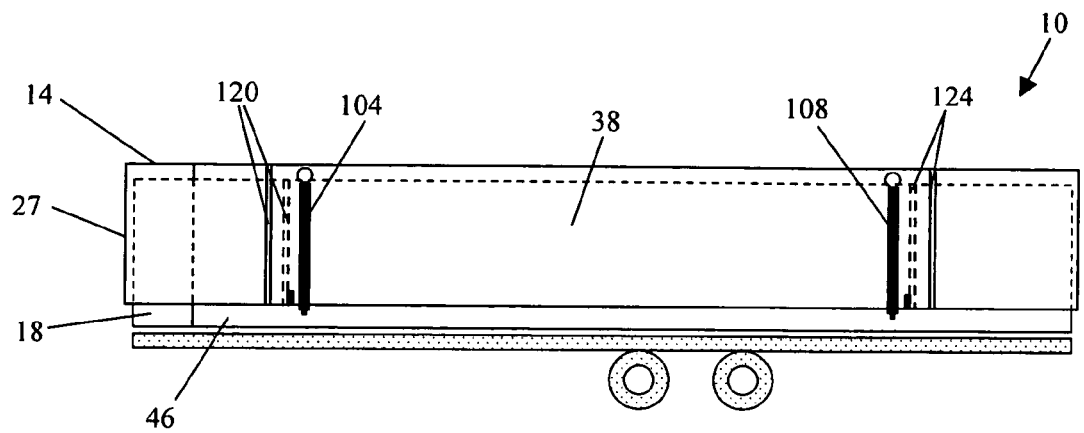
FIG. 3 is a side schematic view of the trailer with the moveable top assembly in a lowered position.
Figure 4:
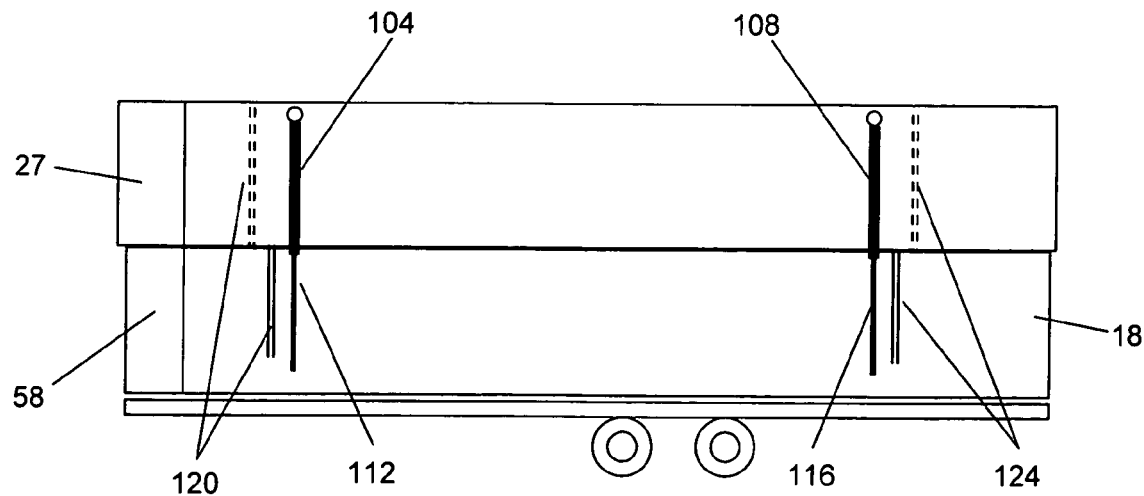
FIG. 4 is a side schematic view of the trailer with the moveable top assembly in a raised position.

FIG. 3 is a schematic side view of the trailer 10. The left side of the trailer is shown, hence the top left fixed wall 38, and base left fixed wall 46 are visible. In this view the top assembly 14 is shown in generally a lowered position over the base assembly. A first linear actuator 104 and a second linear actuator 108 are shown in communication with the top left fixed wall 38 and the base left fixed wall 46. The actuators 104, 108 are configured to work in tandem with actuators (not seen in this view) in communication with the top right fixed wall 34 and the base right fixed wall 42 to lower and lift the top assembly 14 up with respect to the base assembly 18. FIG. 4 is a schematic view of the trailer 10 with actuator rods 112, 116 of the actuators 104, 108 fully extended thereby raising the top assembly 14 to its generally fully raised position with respect to the base assembly 18. Also shown in FIGS. 3 and 4 are a first double linear guide system 120 and a second linear guide system 124. Each double linear guide system 120, 124 comprises an inner guide member 128, such as, but not limited to a "T" block, and an outer guide rail 132 (shown more clearly in FIGS. 4 and 5). The double linear guide systems 120, and 124 are located in the interior of the trailer 10. The double linear guide systems 120, 124 are shown in communication with the top left fixed wall 38, and the base left fixed wall 46. There are also a matching set of double linear guide systems in communication with the top right fixed wall 34, and the base right fixed wall 42, not shown in FIGS. 3 and 4.

Figure 5A:
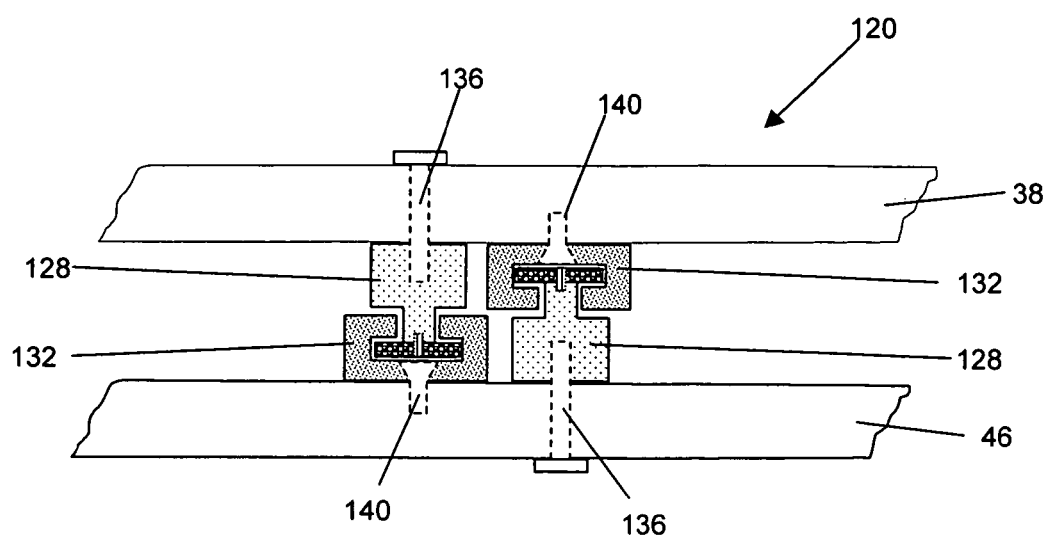
FIG. 5*a* is a cross-sectional view of the double linear guide system.
Figure 5B:
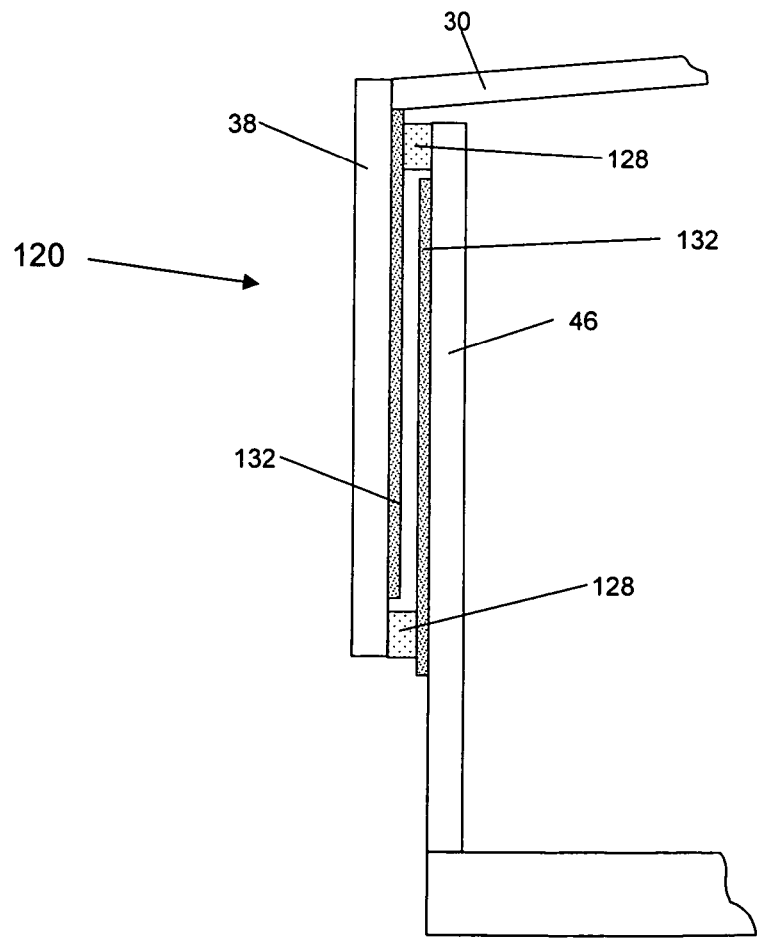
FIG. 5*b* is a side view of the double linear guide system from FIG. 5*a*.

FIG. 5a shows a top view of the first double linear guide system 120. As seen in this view, both the inner guide members 128, 128 are attached to the wall (either the top right fixed wall 38 or the base left fixed wall) each is adjacent to. Additionally the outer guide rails 132 are attached to the wall (either the top right fixed wall 38 or the base left fixed wall) each is adjacent to. In the embodiment shown in FIG. 5, the inner guide members 128 are attached to the walls via bolts 136, and the out guide rails are attached to the walls via flush screws 140, of course one of ordinary skill in the art will understand that various suitable attachment means may be used. FIG. 5b is a side view of the double linear guide system 120.

Figure 6:
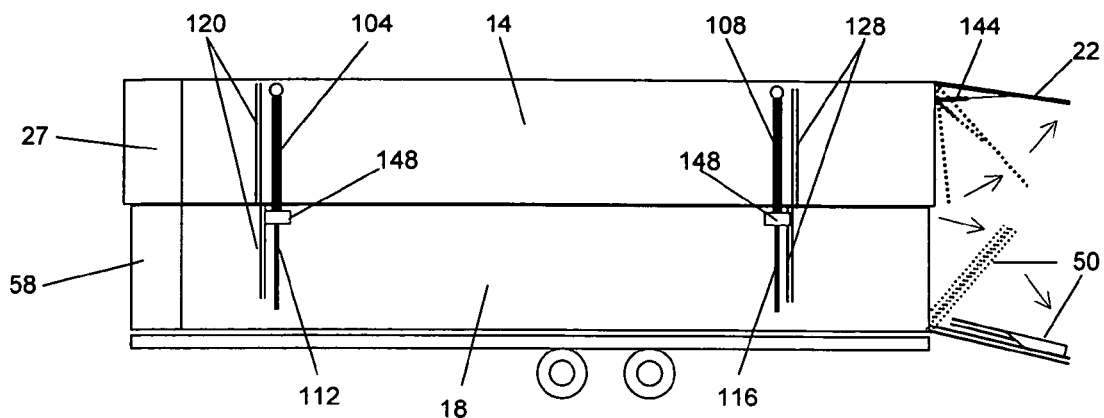
FIG. 6 is a side schematic view of the trailer with the aft doors shown in the open position.
Figure 7:
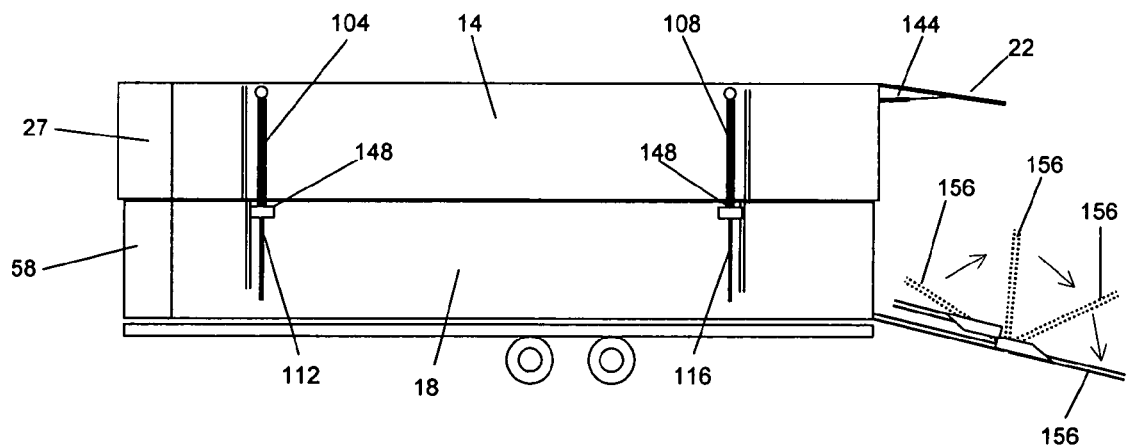
FIG. 7 is side schematic view of the trailer with the base rear folding door shown being unfolded.

FIG. 6 shows a schematic side view of the trailer 10 with the aft top folding door 22 shown moving between a closed and opened position. The aft top folding door 22 may have at least one door piston/cylinder device to maintain to the door 22 in an open configuration when needed. Additionally, FIG. 6 shows the base rear folding door 50 moving between a closed position and an open position. The rear folding door may have a spring assist device to facilitate opening and closing. FIG. 7 shows the base rear folding door 50 being unfolded into an upper ramp 152 and into lower ramp 156. Because the base rear folding door 50 can be unfolded into upper and lower ramps 152, 156, it allows for a less steep ramp, as opposed to a non-folding ramp thus allowing for the closed height of about 4 feet to be obtained. Additionally, in FIGS. 6 and 7, the actuator rods 112 are shown in communication with actuator rod guides 148. The actuator rod guides 112 are attached to interiors of the base right fixed wall 42 and the base left fixed wall 46 and prevent the actuator rods 112 from bowing effects when the travel of the rods 112 are relatively long.

Figure 8:
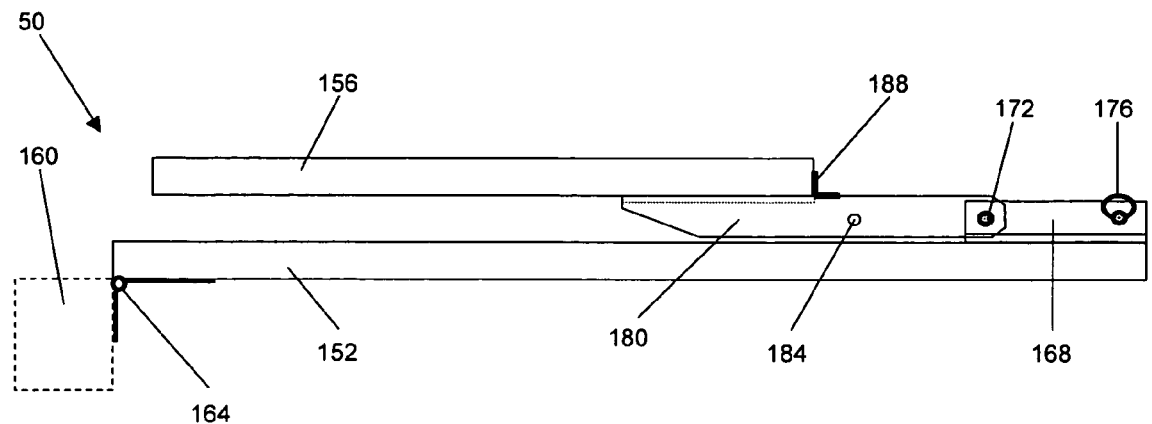
FIG. 8 is a detailed view of the base rear folding door in the folded position.
Figure 9:
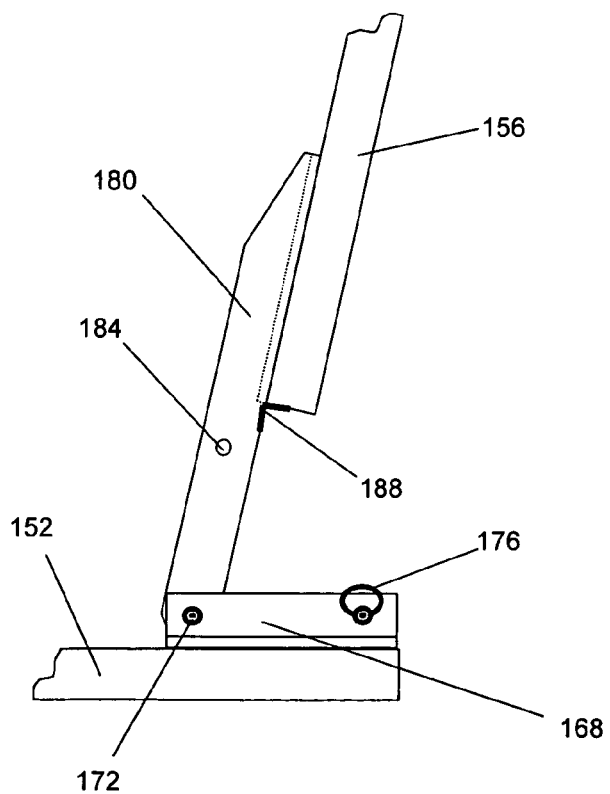
FIG. 9 is a view of the base rear folding door unfolded to about a 90 degree position.
Figure 10:
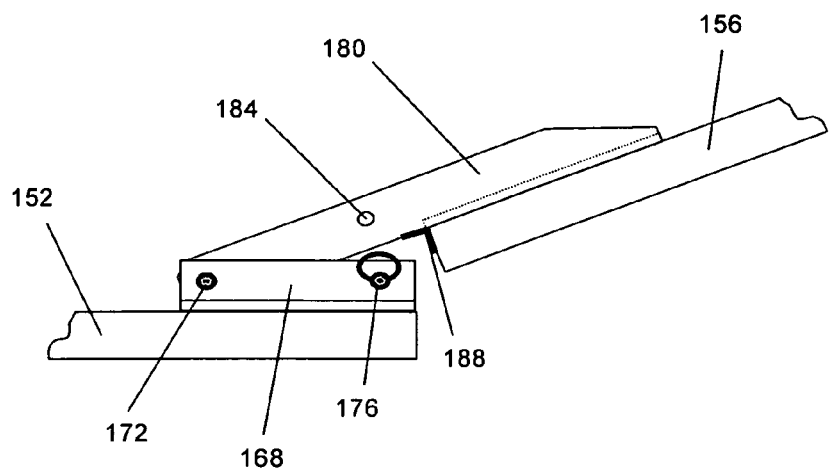
FIG. 10 is a view of the base rear folding door unfolded to about a 150 degree position.
Figure 11:
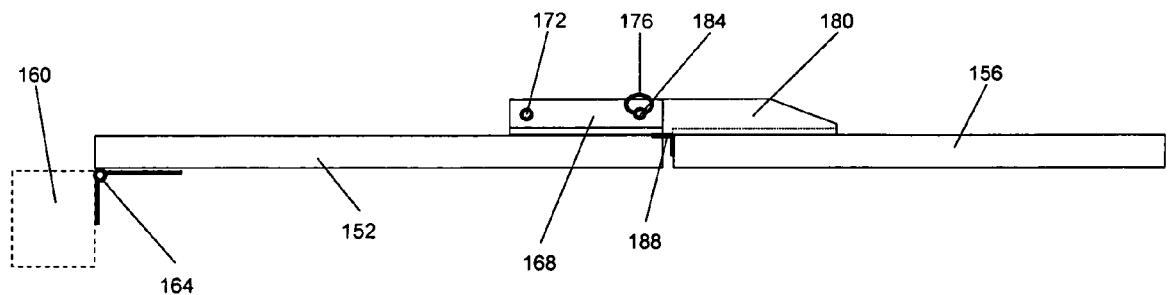
FIG. 11 is a view of the base rear folding door in its unfolded and locked position.

FIG. 8 shows more detail of one embodiment of the base rear folding door 50. The upper ramp 152 is attached to a trailer substructure 160. The trailer substructure 160 may be attached to trailer wheels, and towing apparatus. The means of attachment is a hinge 164. Fixedly attached to the upper ramp is a locking plate 168. The locking plate 168 comprises a hinged pivot point 172 and a locking pin 176. Rotatably attached to the locking plate 168 is a connector plate 180. The connector plate has a locking hole 184. The connector plate 180 is configured to rotate about the hinged pivot point 172. Fixedly attached to the connector plate is the lower ramp 156. A reinforcement member 188, such as a length of angle iron, may be attached to provide support to the lower ramp 156 and the connector plate 180 when in the unfolded and locked position. FIG. 9 shows the connector plate 180 and lower ramp 156 rotated about 90 degrees from the folded orientation of FIG. 8. FIG. 10 shows the connector plate 180 and lower ramp 156 rotated about 150 degrees from the folded orientation of FIG. 8. FIG. 11 shows the connector plate 180 and lower ramp 156 rotated to its unfolded locked position. The locking pin 176 has been inserted into the locking hole 184 to lock the lower ramp 156 in place.

Figure 12:
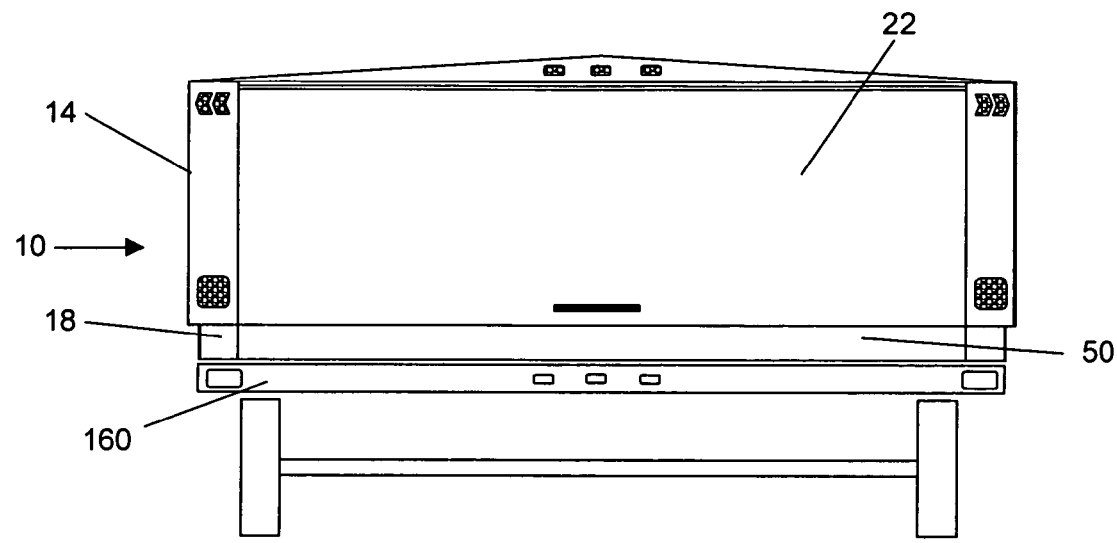
FIG. 12 is a rear view of the trailer with the moveable top assembly in a lowered position.
Figure 13:
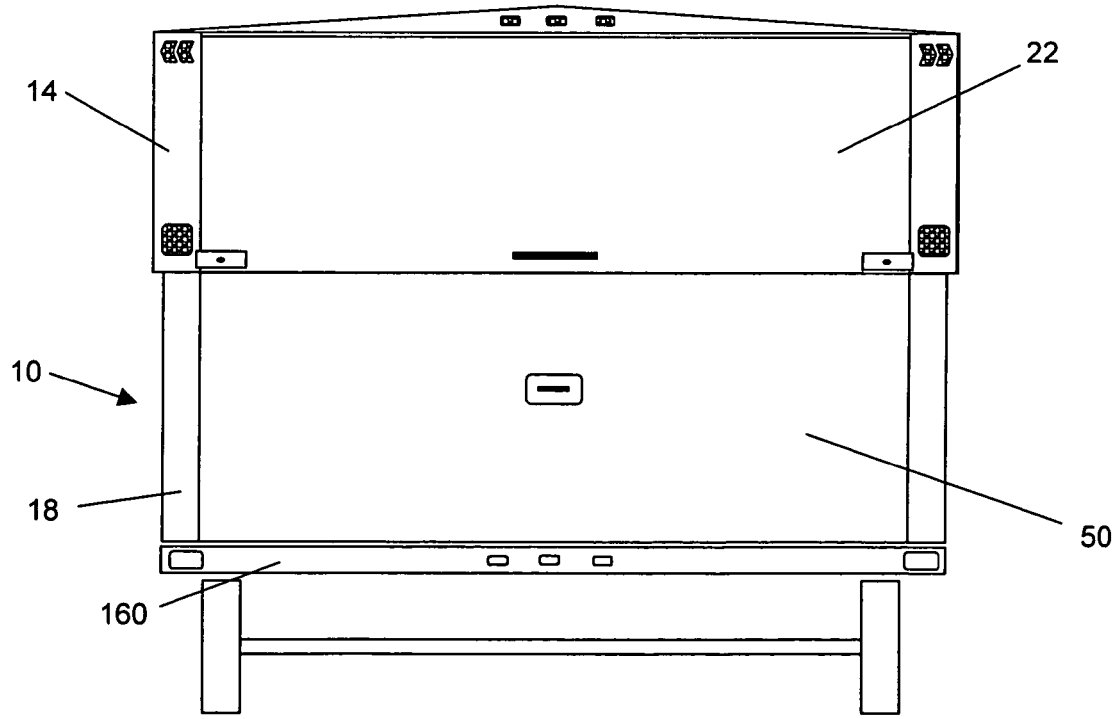
FIG. 13 is a rear view of the trailer with the moveable top assembly in a raised position.

FIG. 12 shows a rear view of the trailer 10, with the moveable top assembly 14 in a lowered position over the base assembly 18. FIG. 13 shows a rear view of the trailer 10, with the moveable top assembly 14 in a raised position with respect to the base assembly 18.

Figure 14:
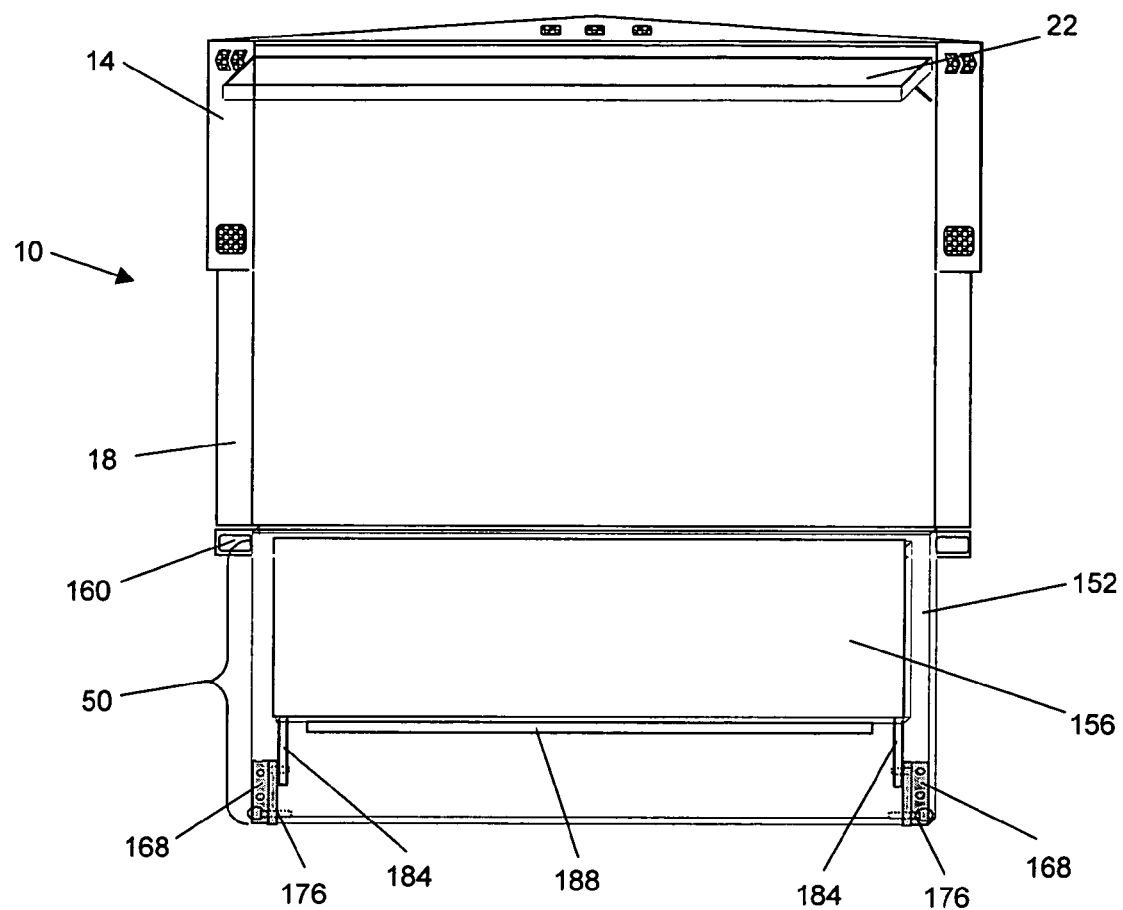
FIG. 14 is a rear view of the trailer with the top door and base rear folding door opened.
Figure 15:
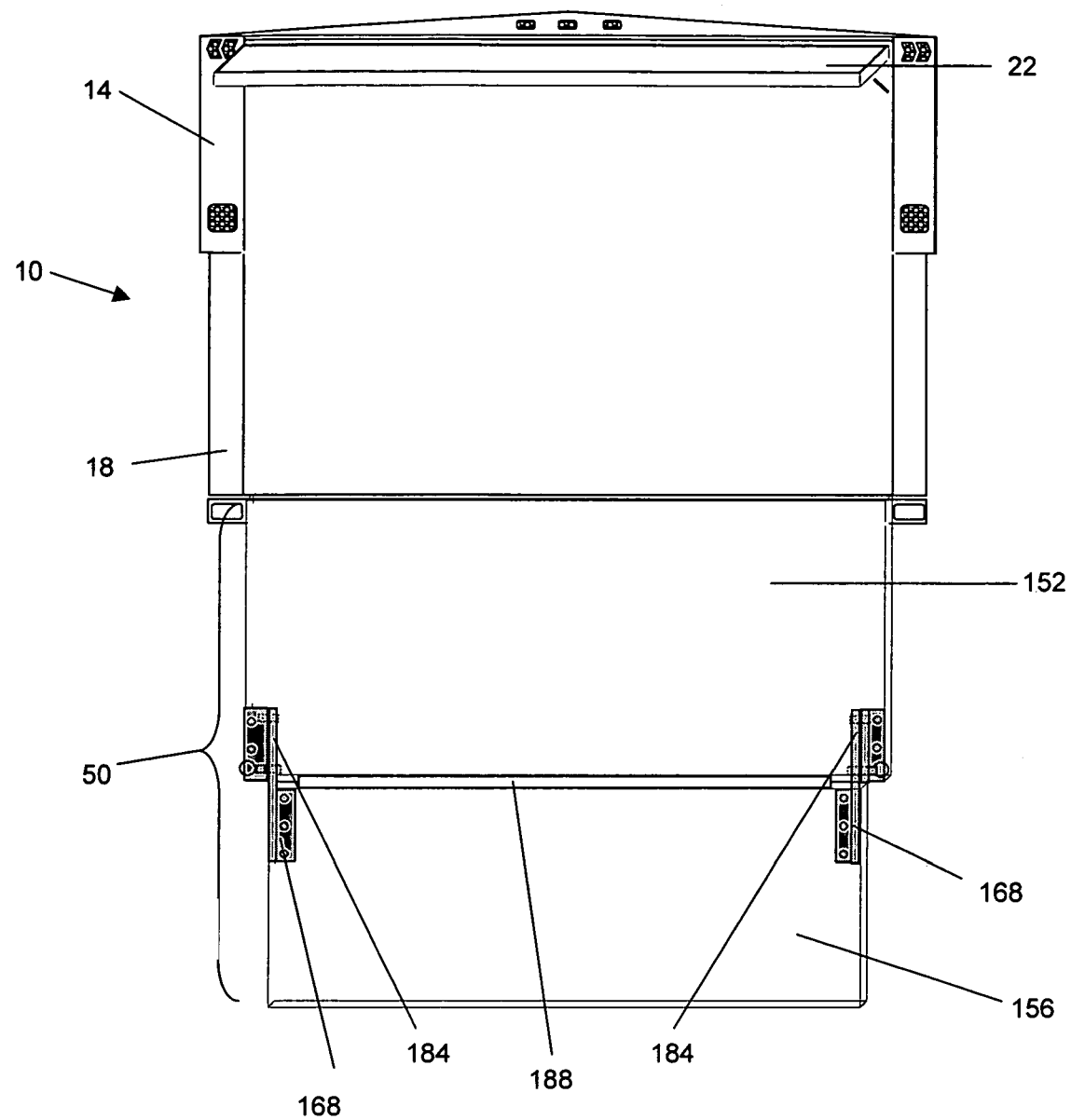
FIG. 15 is a rear view of the trailer with the top door and base rear folding door unfolded.

FIG. 14 shows a rear view of the trailer 10 with the moveable top assembly 14 in a raised position. Additionally, the aft top folding door 22 is shown in an opened position. The base rear folding door 50 is shown folded out of the trailer 10, but with the upper and lower ramps 152, 156 folded. FIG. 15 shows a rear view of the trailer with the upper and lower ramps 152, 156 unfolded.

Figure 16:
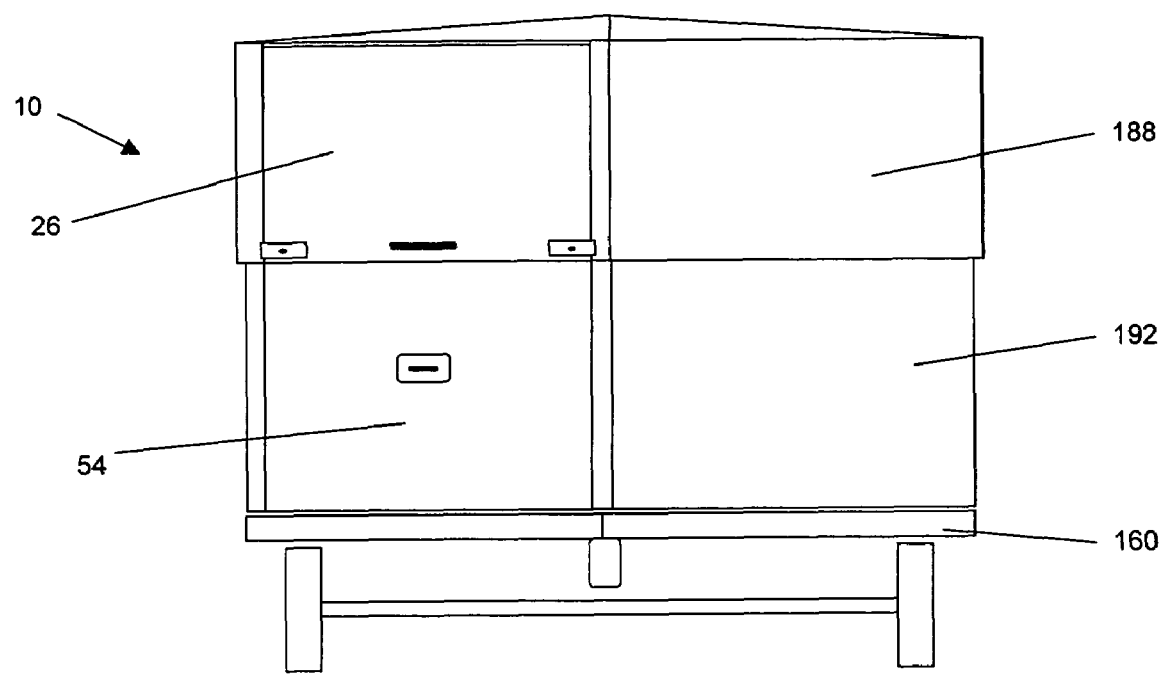
FIG. 16 is a front view of the trailer; with the top door and base front folding door closed.
Figure 17:
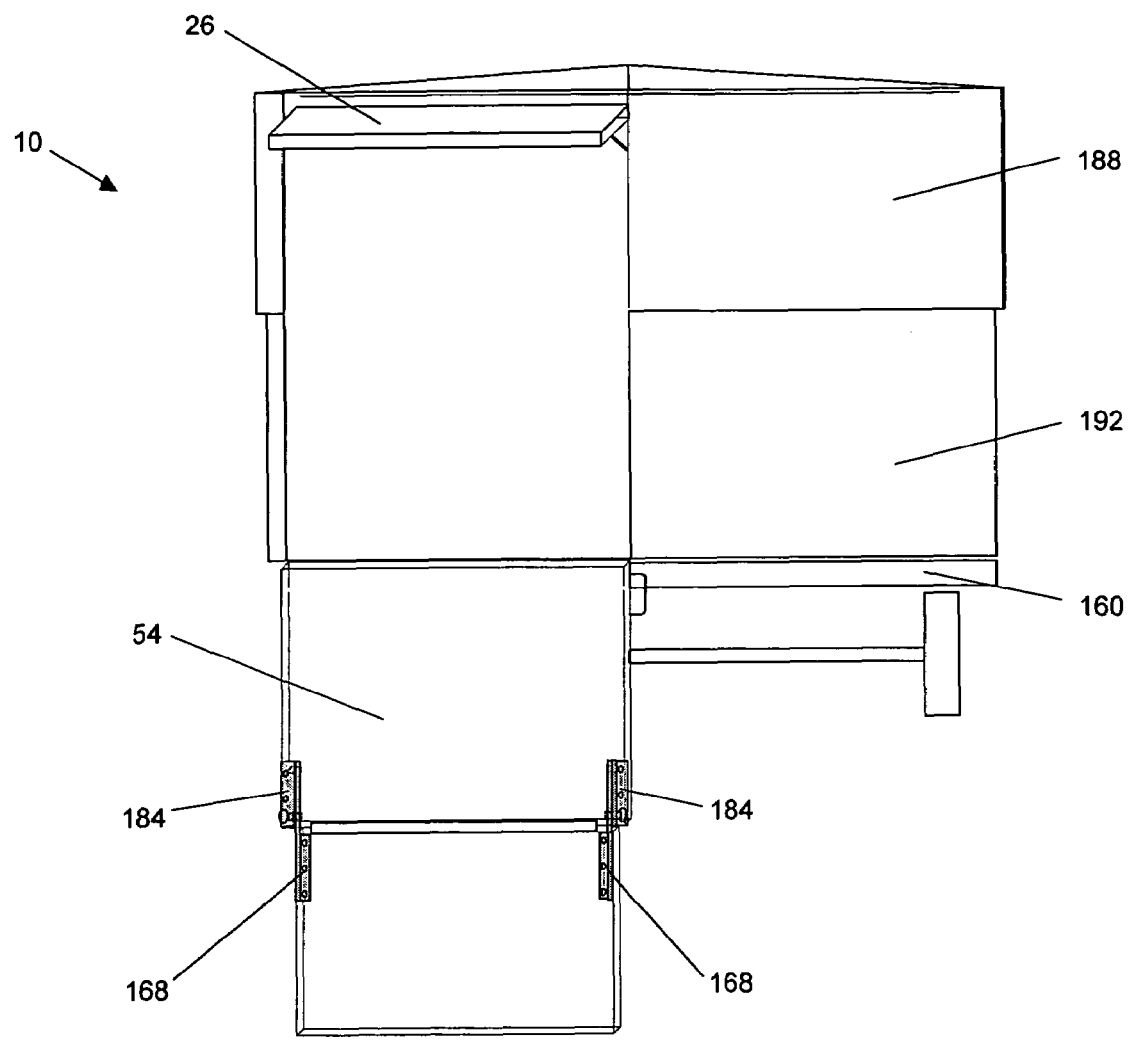
FIG. 17 is a front view of the trailer with the top front right folding door and the base right front folding door opened.

FIG. 16 shows a front view of the trailer 10. In this embodiment, the trailer 10 has a top front right folding door 26 and a fixed wall 188 on top front left of the trailer. Similarly, the trailer has a base right front folding door 54, and a fixed wall 192 on the base left front. The doors 26, 54 are shown closed in this Figure. FIG. 17 shows the top front right folding door 26 opened, and the base right front folding door 54 opened. In other embodiments, there may also be a top left right folding door and a base left front folding door. In still other embodiments, there may be no top front right folding door 26, and no base right front folding door 54. In still other embodiments, the front of the trailer may have no doors at all.

The trailer is constructed and assembled on multiple custom fixtures that support the frames, stringers, sidewall and roof sections in the proper location for welding, attaching of outer skin and connecting the moveable top assembly 14 to the base assembly 18 via linear actuators and sidewall double linear guide system. The trailer may be wired to provide power to linear actuators, low limit switch, 12 volt marker, turn and brake lights along with interior lighting (110 volt AC florescent lighting powered via an inverter). Once the trailer is assembled the entire trailer may be lowered on to any flat trailer and is bolted to support brackets previously attached to the trailer's primary substructure along with attaching the fold-out front and rear ramp assemblies.

After being installed the trailer may be raised (by either using the remote key-fob switch or by using the hardwired weatherproof switch mounted on the trailer) to its maximum internal height of seven feet. The upper doors and fold-out ramps may be opened and the contents of choice are loaded. Once loading is complete the maximum height of the contents is determined and the low limit switch is set (infinite height settings between four and seven feet), the upper doors and fold-out ramps are closed and secured, the unit is then lowered to the predetermined height dictated by the contents, thus eliminating towing any dead air space.

Upon arrival at the intended destination, the enclosure system may again be raised to its maximum internal height of seven feet (trailer height can be raised and stopped anywhere between four and seven feet) and the contents can be unloaded via the front or rear ramps. Because the enclosure system is completely self contained the tow vehicle can be disconnected and the trailer can function as a mobile garage/workshop and can be raised or lowered at will.

The disclosed trailer has many advantages. The trailer is completely modular and can be attached to any existing flat trailer of any size or type (Deep-V, Short-V or Square nose, etc). The trailer may be configured to lower to an industry leading low internal height of four feet. The trailer has infinite height settings between four and seven feet to provide custom fitting to any particular internal cargo height, thus eliminating towing dead air space and increasing fuel economy. The pointed roof truss design ensures proper drainage of water and sheeting of snow and ice, while providing the necessary structural strength to support the load of a moving roof assembly. The double fold front and rear ramp design with unique locking hinge mechanism allows for the industry leading low internal height of about four feet. The disclosed trailer system and folding ramp can be retrofitted to nearly any flat trailer and allow for a industry leading low height of 4 feet.

The ramps also fold in, allowing the backside of the lower ramp to be the finished exterior of the trailer. When folded out, the ramps provide a ramp length adequate for the loading any wheeled vehicle, snowmobile, etc. The actuator rod guides and double linear guide system provide the necessary structural rigidity/stability required to support the sidewalls when the front and rear ramps are open and prevents the linear actuators from being side loaded. The trailer may be self-contained and may be powered by an on-board 12 volt high output deep cycle Gel-Cell battery that is trickle charged via the tow vehicle. This allows the enclosure system to operate independently of the tow vehicle when required. The unique down limit switch system can be set to an infinite number of settings between four and seven feet to ensure the contents are not impacted when the enclosure system is lowered. The trailer may have a power inverter that allows an onboard 12-volt DC system to power the 110-volt AC lighting within the trailer thus providing optimal lighting to perform any function within the trailer.

It should be noted that the terms "first", "second", and "third", and the like may be used herein to modify elements performing similar and/or analogous functions. These modifiers do not imply a spatial, sequential, or hierarchical order to the modified elements unless specifically stated.

While the disclosure has been described with reference to several embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiments disclosed as the best mode contemplated for carrying out this disclosure, but that the disclosure will include all embodiments falling within the scope of the appended claims.

What is claimed is:

1. A retractable and extensible trailer comprising:
a base assembly;
a moveable top assembly moveably attached to the base assembly and configured to be infinitely adjustable between a lowered position and an upper position;
a trailer substructure in communication with the base assembly;
a base rear folding door located at the rear of the base assembly and in rotative communication with the trailer substructure, the base rear folding door comprising:
an upper ramp in rotative communication with the trailer substructure;

at least one locking plate in fixed communication with the upper ramp;

at least one connector plate in rotative communication with the at least one locking plate; and a lower ramp in fixed communication with the at least one connector plate.

2. The retractable and extensible trailer of claim 1, further comprising:

at least one double linear guide system comprising:

a first outer guide rail in fixed communication with the exterior of the base assembly;

a second outer guide rail in fixed communication with the interior of the moveable top assembly;

a first inner guide member in fixed communication with the interior of the moveable top assembly and in slideable communication with the first outer guide rail; and a second inner guide member in fixed communication with the exterior of the base assembly and in slideable communication with the second outer guide rail.

3. The retractable and extensible trailer of claim 2, wherein the first inner guide member and the second inner guide member are both "T" blocks.

4. The retractable and extensible trailer of claim 1, further comprising:

a plurality of trusses in fixed communication with the moveable top assembly and configured to form a pointed roof.

5. The retractable and extensible trailer of claim 1, further comprising:

a wiper seal assembly configured to prevent foreign material to enter the interior of the trailer, the assembly comprising:

a rigid member connector in fixed communication with the interior of the moveable top assembly; and a rigid member in communication with the flexible member connector, and in slideable communication with the base assembly.

6. The retractable and extensible trailer of claim 1, further comprising:

a pointed front.

7. The retractable and extensible trailer of claim 6, wherein the pointed front comprises:

at least one top folding door in rotative communication with the moveable top assembly;

at least one a base front folding door located at the front of the base assembly and in rotative communication with the trailer substructure, the at least one base front folding door comprising:

an upper ramp in rotative communication with the trailer substructure;

at least one locking plate in fixed communication with the upper ramp;

at least one connector plate in rotative communication with the at least one locking plate; and a lower ramp in fixed communication with the at least one connector plate.

8. The retractable and extensible trailer of claim 1, further comprising:

a first linear actuator in fixed communication with the moveable top assembly, the first linear actuator comprising a first actuator rod, the first actuator rod in fixed communication with the base assembly;

a second linear actuator in fixed communication with the moveable top assembly, the second linear actuator comprising a second actuator rod, the second actuator rod in fixed communication with the base assembly;

wherein the first linear actuator and the second linear actuator are configured to raise and lower the moveable top assembly with respect to the base assembly.

9. The retractable and extensible trailer of claim 8, further comprising:

a first actuator rod guide in fixed communication with the base assembly, and in slideable communication with the first actuator rod; and a second actuator rod guide in fixed communication with the base assembly, and in slideable communication with the second actuator rod.

\* \* \* \* \*